(12) United States Patent
Konchan et al.

(10) Patent No.: US 9,555,731 B2
(45) Date of Patent: Jan. 31, 2017

(54) TRUCK BODY WITH RAPID LOAD/UNLOAD CARGO PODS

(71) Applicant: GM Global Technology Operations LLC, Detroit, MI (US)

(72) Inventors: Jeffrey L. Konchan, Romeo, MI (US); Ian S. Buckley, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 14/193,283

(22) Filed: Feb. 28, 2014

(65) Prior Publication Data

US 2015/0246631 A1    Sep. 3, 2015

(51) Int. Cl.
*B60P 1/02*    (2006.01)
*B60P 1/44*    (2006.01)
*B60P 1/64*    (2006.01)

(52) U.S. Cl.
CPC .................. *B60P 1/022* (2013.01); *B60P 1/02* (2013.01); *B60P 1/4414* (2013.01); *B60P 1/6445* (2013.01)

(58) Field of Classification Search
CPC ............ B60P 1/022; B60P 1/02; B60P 1/6445
See application file for complete search history.

(56) References Cited

U.S. PATENT DOCUMENTS

| | | | | |
|---|---|---|---|---|
| 3,752,336 A | * | 8/1973 | Blount | B60P 1/64 108/48 |
| 3,891,102 A | * | 6/1975 | Blount | B60P 1/4421 211/118 |
| 4,009,792 A | * | 3/1977 | Sano | B60P 1/64 414/499 |
| 4,093,089 A | * | 6/1978 | Bohman | B60P 1/36 198/733 |
| 5,803,698 A | * | 9/1998 | Hoenersch | B60P 1/02 296/203.03 |
| 6,464,446 B1 | * | 10/2002 | Hurler | B60P 1/02 414/495 |
| 6,571,913 B2 | | 6/2003 | Puszkiewicz et al. | |
| 7,524,157 B2 | * | 4/2009 | Hurler | B60P 1/02 280/800 |
| 8,043,040 B2 | * | 10/2011 | Nespor | B60P 1/02 414/401 |
| 8,177,471 B2 | * | 5/2012 | Nespor | B60P 1/02 414/544 |
| 9,061,624 B2 | * | 6/2015 | Bryant | B60P 1/48 |

(Continued)

FOREIGN PATENT DOCUMENTS

CN    2635441 Y    8/2004
CN    202123972 U    1/2012

(Continued)

OTHER PUBLICATIONS

German Office Action dated Feb. 11, 2016: Application No. 10 2015 102 576.0 ; Applicant: GM Global Technology Operations LLC.; 7 pages.

(Continued)

*Primary Examiner* — Kaitlin Joerger
(74) *Attorney, Agent, or Firm* — BrooksGroup

(57) ABSTRACT

One variation may include a truck body having one or more cargo pod lift systems around the perimeter of a truck's center aisle which may be lifted or lowered to load/unload one or more cargo pods and a method for doing the same.

20 Claims, 7 Drawing Sheets

(56) References Cited

U.S. PATENT DOCUMENTS

| | | |
|---|---|---|
| 2009/0208315 A1 | 8/2009 | Hurler |
| 2011/0305550 A1* | 12/2011 | Haire ........................ B60P 1/02 414/495 |
| 2014/0212253 A1* | 7/2014 | Bryant ...................... B60P 1/43 414/470 |
| 2014/0219754 A1* | 8/2014 | Timonen ............... B60P 1/6436 414/502 |
| 2015/0232134 A1* | 8/2015 | Lavmand .................. B60P 1/02 414/679 |
| 2015/0239386 A1* | 8/2015 | Bryant .................. B60P 1/6436 414/527 |
| 2015/0239389 A1* | 8/2015 | Konchan ................... B60P 1/02 414/495 |
| 2015/0246631 A1 | 9/2015 | Konchan et al. |

FOREIGN PATENT DOCUMENTS

| | | |
|---|---|---|
| DE | 4442939 A1 | 6/1995 |
| DE | 102004004346 A1 | 8/2005 |
| DE | 202007016438 U1 | 1/2008 |
| JP | 58180328 A * | 10/1983 |

OTHER PUBLICATIONS

Chinese Office Action dated Oct. 8, 2016; Application No. 1201510089499.2; Applicant: GM Global Technology Operations LLC.; 10 pages.

* cited by examiner

TRUCK BODY WITH RAPID LOAD/UNLOAD CARGO PODS

TECHNICAL FIELD

The field to which the disclosure generally relates to includes cargo trucks.

BACKGROUND

A cargo truck may transport one or more cargo pods.

SUMMARY OF ILLUSTRATIVE VARIATIONS

One variation may include a product comprising: a truck body comprising: a center aisle, a first wheelhouse, a second wheelhouse, and one or more cargo pod lift systems integrated into the perimeter of the truck body; and wherein the one or more cargo pod lift systems are constructed and arranged to lift and lower one or more cargo pods.

Another variation may include a method comprising: loading and unloading one or more cargo pods into a cargo truck comprising: integrating the perimeter of a truck body with one or more cargo pod lift systems; wherein the one or more cargo pod lift systems can be raised or lowered to any of a down position, a driving position, or a full position; lowering the one or more cargo pod lifts to a down position and loading one or more cargo pods onto the one or more cargo pod lift systems; raising the one or more cargo pod lift systems to a full position and loading the one or more cargo pods to a center aisle of the truck body; lowering the one or more cargo pod lift systems to the driving position during transport; raising the one or more cargo pod lift systems to load the cargo pods from the center aisle of the truck body back to the one or more cargo pod lift systems; and lowering the one or more cargo pod lift systems to a down position to unload the one or more cargo pods.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In any of a number of variations, a cargo truck may be used to transport any of a number of variations of cargo pods. In any of a number of variations, a cargo pod delivery or pick-up area for any of a number of cargo trucks may be limited in space and may require accelerated loading and/or unloading of the cargo pods.

Figure 1:
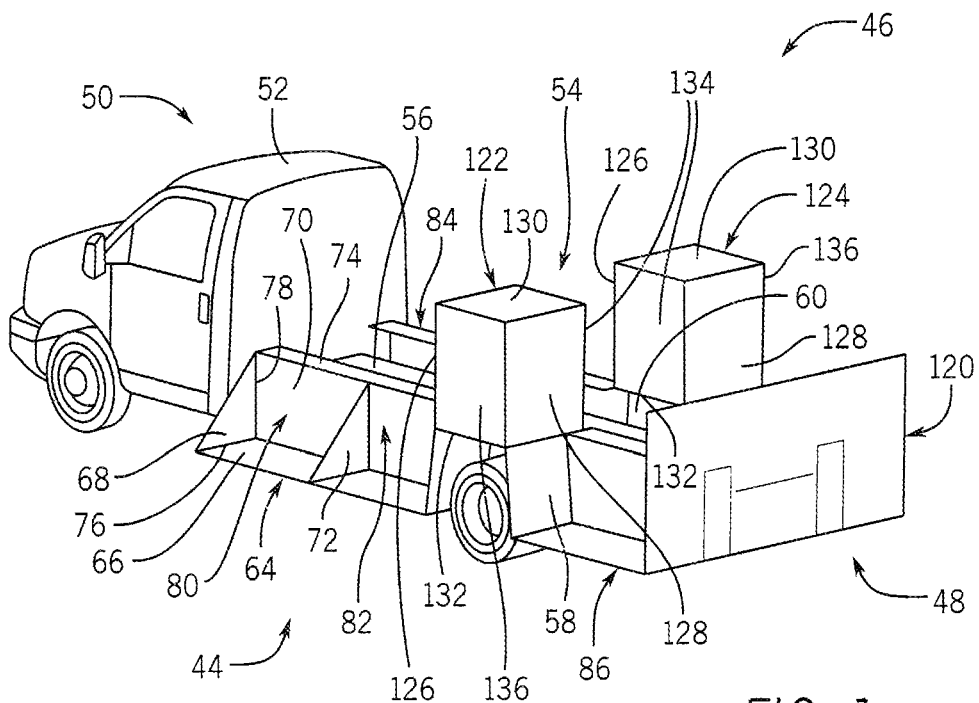
FIG. 1 illustrates perspective view of a truck including cargo pod loading/unloading body systems according to a number of variations.

Referring to FIG. 1, in any of a number of variations, a cargo truck 50 may include a cab portion 52 and a body portion 54. In any of a number of variations, the body portion 54 may include a center aisle 56 and one or more cargo pod lift systems 64, 84, 86 which may be integrated into the driver's side 44, passenger's side 46, and/or rear end 48 of the perimeter of the truck body 54 which may increase the speed and efficiency of loading and unloading cargo pods 176 (best illustrated in FIG. 10), including situations where there may be limited space available to conduct the loading/unloading of the cargo pods 176.

Figure 2:
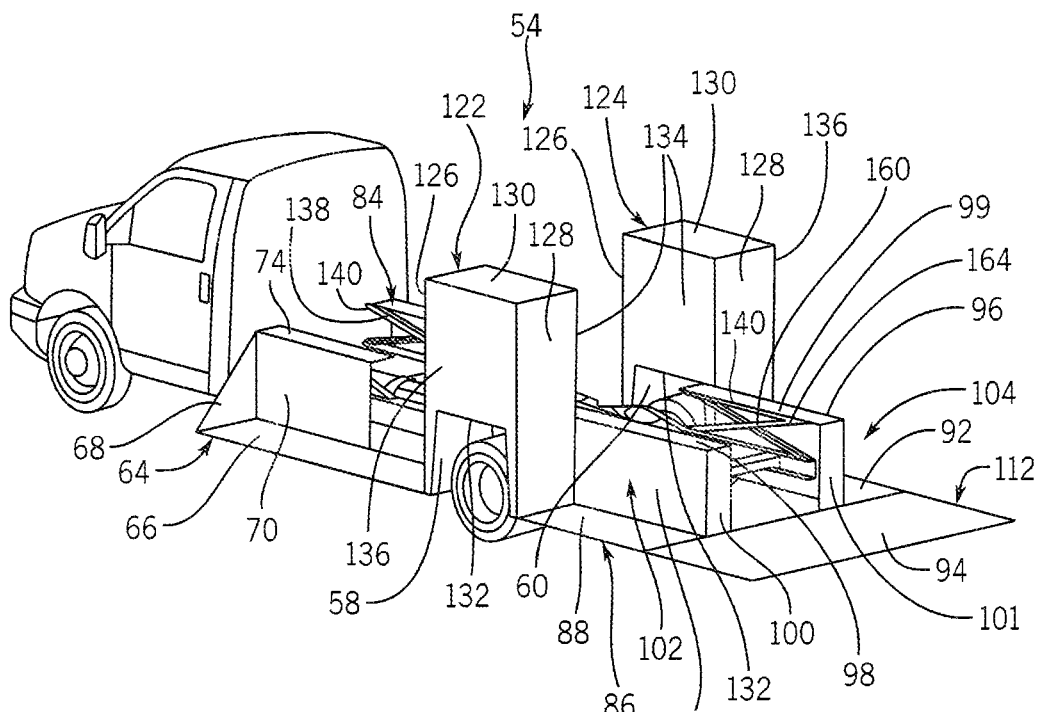
FIG. 2 illustrates a perspective view of a truck including cargo pod loading/unloading body systems according to a number of variations.

Referring to FIGS. 1-2, in any of a number of variations, a first cargo pod lift system 64 may be located forward of the driver's side wheelhouse 58. The first cargo pod lift system 64 may include a first floor 66, a first side wall 68, a first back wall 70, a second side wall 72, and a first top shelf 74, for example as illustrated in FIG. 1. The first side wall 68 and the second side wall 72 may be triangular in shape and may be substantially planar. The first side wall 68 may be adjacent the cab portion 52 of the cargo truck 50 and may be attached to the front edge 76 of the first floor 66 and the side edge 78 of the first back wall 70. The second side wall 72 may be located approximately central of the first floor 66 and the first back wall 70 and may create a first cargo space 80, and a second cargo space 82. The first top shelf 74 may extend across the length of the first back wall 70 and may extend a distance inboard of the cargo truck 50. In any of a number of variations, a second cargo pod lift system 84 may be located forward of the passenger's side wheelhouse 60 and may be the mirror image of the first cargo pod lift system 64 and may create a third and fourth cargo space (not illustrated).

In another variation, the second side wall 72 may be removed and the first back wall 70 and the first top shelf 74 may extend a distance approximately halfway to the length of the first floor 66, for example as illustrated in FIG. 2, which may allow for loading and unloading of cargo pods 176 from the first cargo pod lift system 64 and/or the second cargo pod lift system 84 into the center aisle 56 (best illustrated in FIG. 1) when the first cargo pod lift system 64 and/or the second cargo pod lift system 84 are in a full position as will be discussed hereafter.

Figure 5:
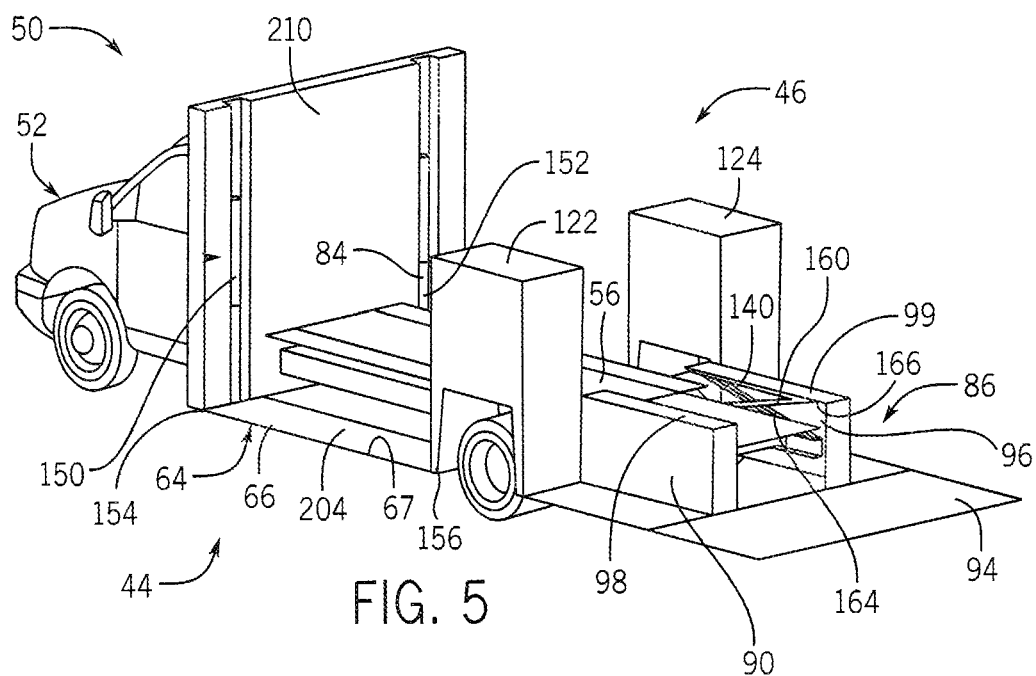
FIG. 5 illustrates a perspective view of a truck including cargo pod loading/unloading body systems according to a number of variations.

Referring to FIG. 5, in another variation, the first back wall 70, the first side wall 68, the second side wall 72, and the first top shelf 74 may be eliminated so that one or more cargo pods 176 may be moved onto the center aisle 56 from the first and/or the second cargo pod lift systems 64, 84 when in a full position as will be discussed hereafter.

Figure 3:
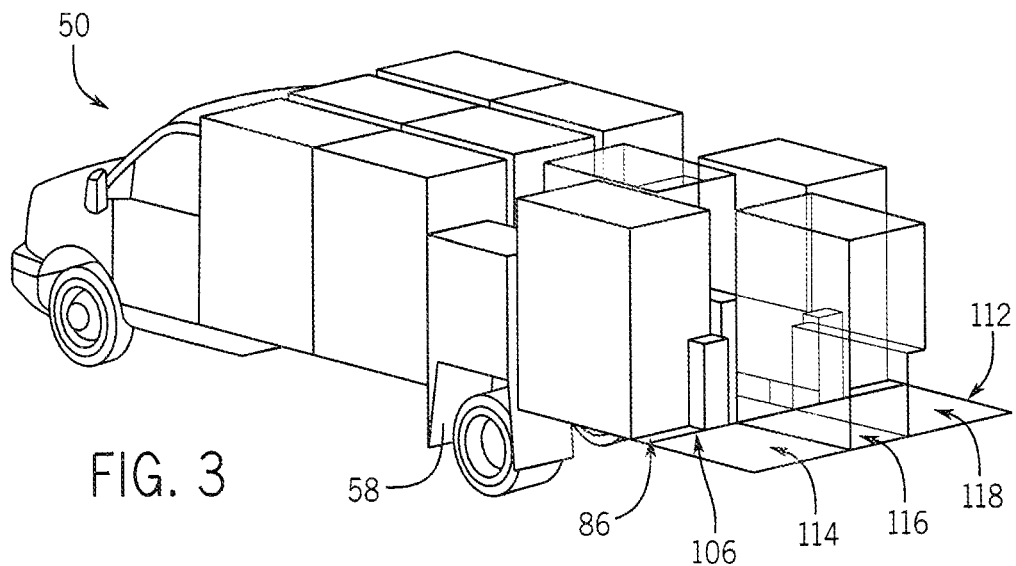
FIG. 3 illustrates a perspective view of a truck including cargo pod loading/unloading body systems according to a number of variations.
Figure 4:
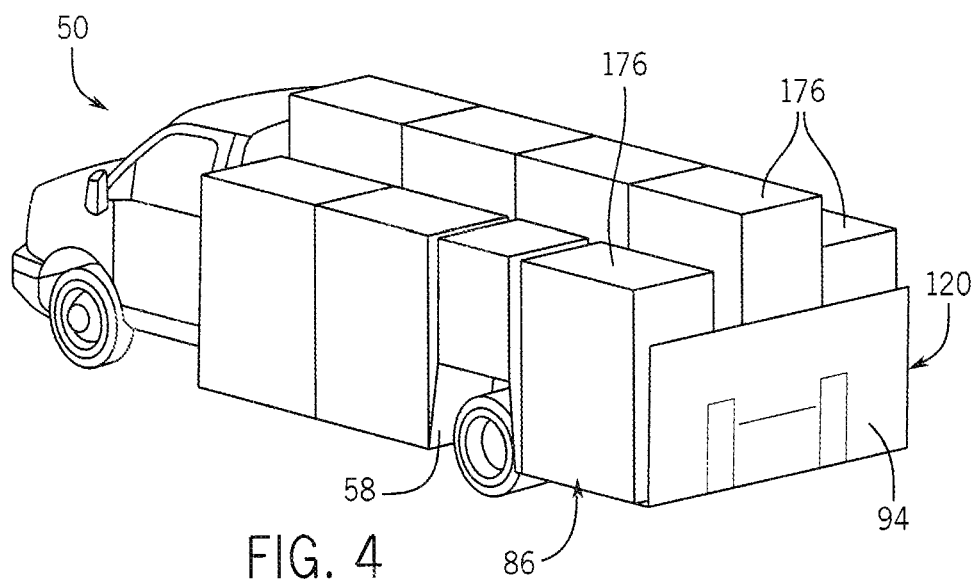
FIG. 4 illustrates a perspective view of a truck including cargo pod loading/unloading body systems according to a number of variations.
Figure 14:
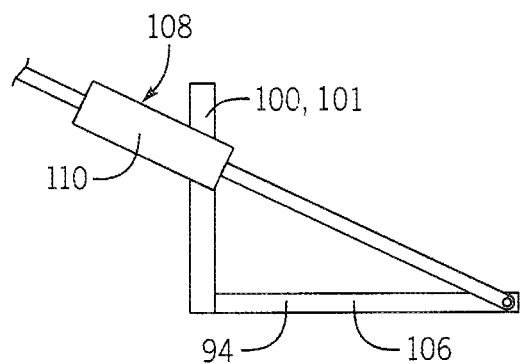
FIG. 14 illustrates a power hinge gate according to a number of variations.

Referring to FIGS. 1-4, and 14, in any of a number of variations, a third cargo pod lift system 86 may be located rearward of each of the driver's side wheelhouse 58 and the passenger's side wheelhouse 60 (best illustrated in FIGS. 1 and 2). The third cargo pod lift system 86 may include a second floor 88, a second back wall 90, a third floor 92, a fourth floor 94, and a third back wall 96, for example as illustrated in FIG. 2. The second and third floors 88, 92 may be any of a number of shapes including, but not limited to, rectangular. The second and third back walls 90, 96 may be any of a number of shapes including, but not limited to, rectangular. The second back wall 90 may include a second top shelf 98 and a first rear wall 100. The third back wall 96 may include a third top shelf 99 and a second rear wall 101. The second floor 88 and second back wall 90 may create a fifth cargo space 102. The third floor 92 and the third back wall 96 may create a sixth cargo space 104. The fourth floor 94 may comprise a fold down drop-gate 106, for example as illustrated in FIG. 14. In any of a number of variations, the fold down drop-gate 106 may be attached to a powered hinge feature 108 which may be powered in any of a number of variations including, but not limited to, hydraulic cylinders 110, for example as illustrated in FIG. 14, or an electric motor. In a number of variations, the drop-gate 106 may be hinged to the first and/or second rear wall 100, 101. The fourth floor drop-gate 106 may be in a down position 112 so that the fourth floor 94 is horizontal, for example as illustrated in FIGS. 2-3, which may create a seventh, eighth, and ninth cargo space 114, 116, 118 (best illustrated in FIG. 3). The fourth floor drop-gate 106 may also be folded upward 120 which may reduce the overall length of the cargo truck 50 when transportation of additional cargo pods 176 in spaces 114, 116, and 118 may not be required, for example as illustrated in FIG. 4. The fourth floor drop-gate 106 may also provide additional security to any cargo pods 176 which may be inside the cargo truck 50 when in a folded up position 120.

Referring to FIGS. 1-2, in any of a number of variations, the truck body portion 54 may also include a first and second side storage box 122, 124 which may be located above the driver's side wheelhouse 58 and the passenger's side wheelhouse 60 respectively. The side storage boxes 122, 124 may include a first wall 126, a second wall 128, a top surface 130, a bottom surface 132, a front wall 134, and a rear wall 136. The side storage boxes 122, 124 may be used to store various sized cargo. The side storage boxes 122, 124 may be accessed from the exterior of the cargo truck 50 through the rear wall 136 or from the truck center aisle 56 from the front wall 134. The side storage boxes 122, 124 may be fixed to the chassis of the cargo truck 50.

Figure 13:
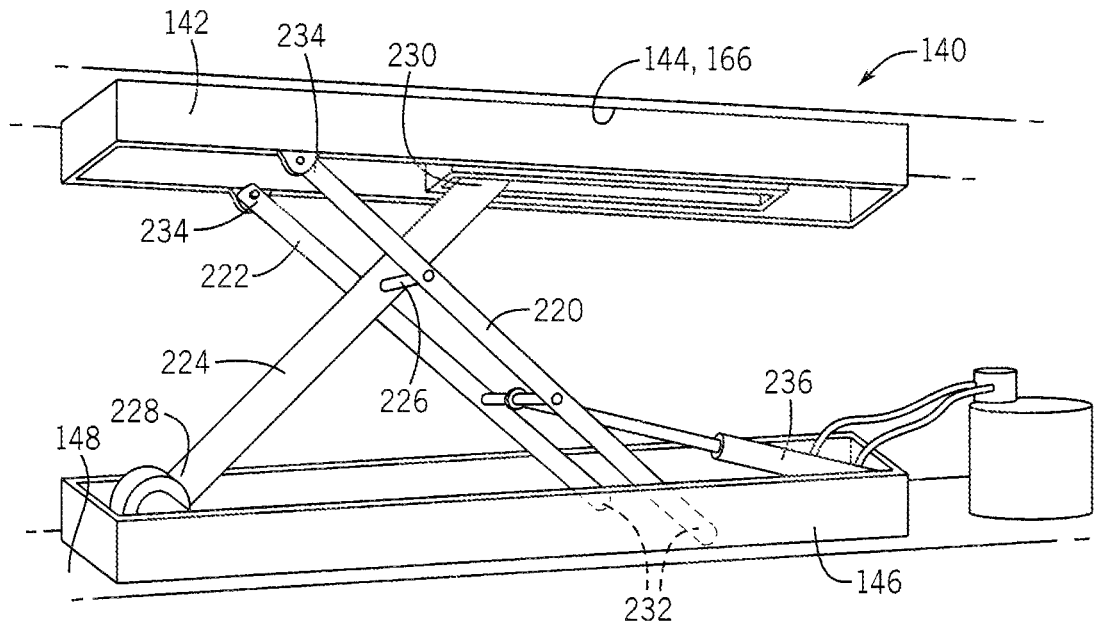
FIG. 13 illustrates a perspective view of a scissor type hoist according to a number of variations.

Referring to FIGS. 2, 6-7, and 13 in any of a number of variations, the first cargo pod lift system 64 may include a first hoist system (not illustrated) and the second cargo pod lift system 84 may include a second hoist system 138. In one variation, the first and second hoist systems 138 may each include a scissor type hoist 140, for example as illustrated in FIGS. 2 and 13. A scissor type hoist 140 may include a first member 220, second member 222, and third member 224, for example as illustrated in FIG. 13. The first member 220 and the second member 222 may lay parallel with each other and may lay at an angle opposite of the third member 224. A pin 226 may extend through each of the first, second, and third members 220, 222, 224. The third member 224 may include a first end 228 and a second end 230. The first end 228 of the third member 224 may be rotatably fixed to a bottom plate 146. The second end 230 of the third member 224 may be slidably attached to an upper plate 142. The first and second members 220, 222 may each include a first end 232 and a second end 234. The first ends 232 of the first and second members 220, 222 may be slidably attached to the bottom plate 146. The second ends 234 of the first and second members 220, 222 may be rotatable attached to the upper plate 142. The upper plate 142 may be attached to the underside of the top shelf 144, 166 and a bottom plate 146 may be attached to the truck frame 148. The first and second members 220, 222 may be actuated by any of a number of power sources including, but not limited to, a hydraulic cylinder 236 (as illustrated in FIG. 13), mechanics, and/or pneumatics, which may mechanically raise or lower the first and second cargo pod lift systems 64, 84.

Figure 12:
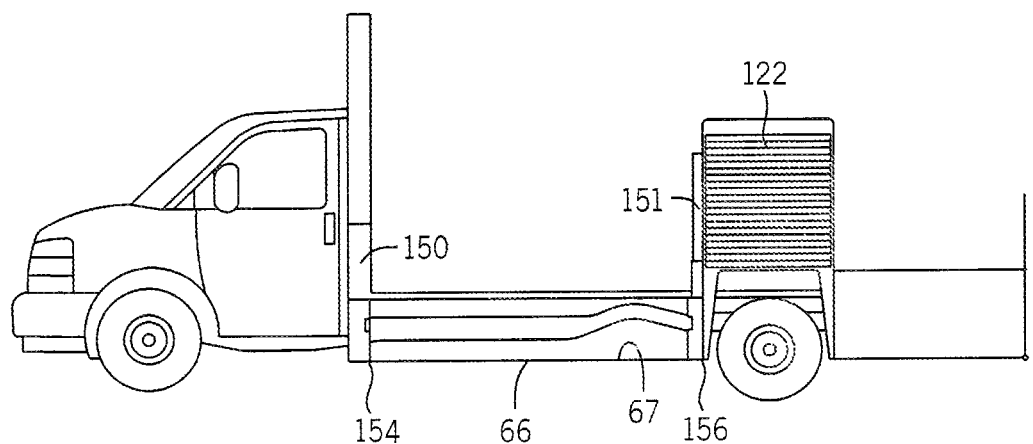
FIG. 12 illustrates a side view of a cargo truck according to a number of variations.

Referring to FIGS. 5 and 12, in any of a number of variations, the first and second hoist systems 138 may comprise one or more hydraulic cylinder hoists. In one variation, a first hydraulic cylinder hoist 150 may be integrated into the driver's side 44 of the fixed bulkhead 210 adjacent the cab portion 52 of the cargo truck 50 and may be attached to the top surface 67 of the first floor 66 adjacent the first side edge 154 of the first floor 66. A second hydraulic cylinder hoist 151 may be integrated into the first side storage box 122 and may be attached to the top surface 67 of the first floor 66 adjacent the second side edge 156 of the first floor 66, for example as illustrated in FIG. 12. A third hydraulic cylinder hoist 152 may be integrated into the passenger's side 46 of the fixed bulkhead 210 and may be attached to a top surface of the first floor (not illustrated) of the second cargo pod lift system 84 adjacent a first side edge of the first floor. A fourth hydraulic cylinder hoist (not illustrated) may be integrated into the second side storage box 124 and may be attached to the top surface of the second cargo pod lift system 84 first floor adjacent a first edge of the first floor.

Referring to FIGS. 2, 5-6, and 13, in any of a number of variations, the third cargo pod lift system 86 may be attached to any of a number of third hoist systems 160 (best illustrated in FIG. 5). In one variation, the third cargo pod lift system 86 may be attached to one or more scissor type hoists 140, as discussed above. In one variation, a first scissor hoist as discussed above and illustrated in FIG. 13, may be attached to the underside 166 of the second top shelf 98 on the second back wall 90 (not illustrated) and a second scissor hoist 164 may be attached to the underside 166 of the third top shelf 99 on the third back wall 96, for example as illustrated in FIG. 5. Both the first scissor lift and the second scissor lift 164 may be attached to the same actuator as discussed above, or may each be powered independently.

The first and the second scissor lifts 164 may work in conjunction to raise the third cargo pod lift system 86.

In any of a number of variations, the first hoist system, second hoist system 138, and the third hoist system 160 may be controlled simultaneously so that each cargo pod lift system 64, 84, 86 raises or lowers at the same time. In another variation, each hoist system 138, 160 may be controlled independently so that each cargo pod lift system 64, 84, 86 may be raised or lowered at various intervals.

Figure 6:
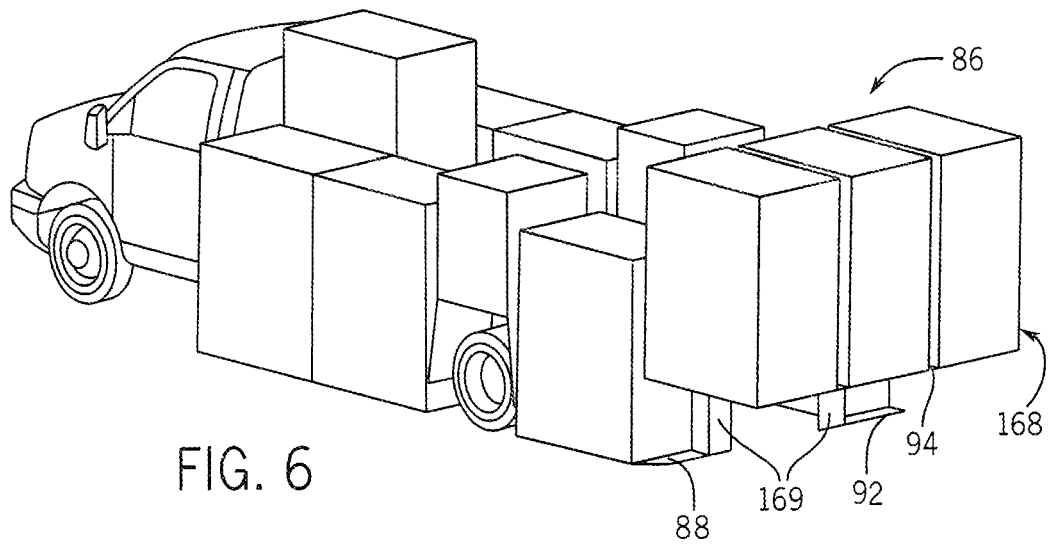
FIG. 6 illustrates a perspective view of a truck including cargo pod loading/unloading body systems according to a number of variations.
Figure 15:
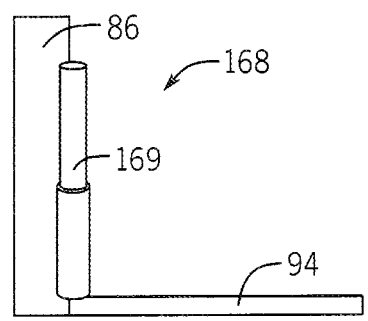
FIG. 15 illustrates a vertical lift according to a number of variations.

Referring to FIGS. 6 and 15 in yet another variation, the fourth floor 94 may include its own vertical hoist system 168, which may include any of a number of vertical hoist systems including, but not limited to, a vertical hydraulic lift 169. The vertical hydraulic lift 169 may be attached to a third cargo pod lift system 86, for example as illustrated in FIG. 15. In this variation, the fourth floor 94 may be lifted or lowered independently from the second and third floors 88, 92.

Figure 7:
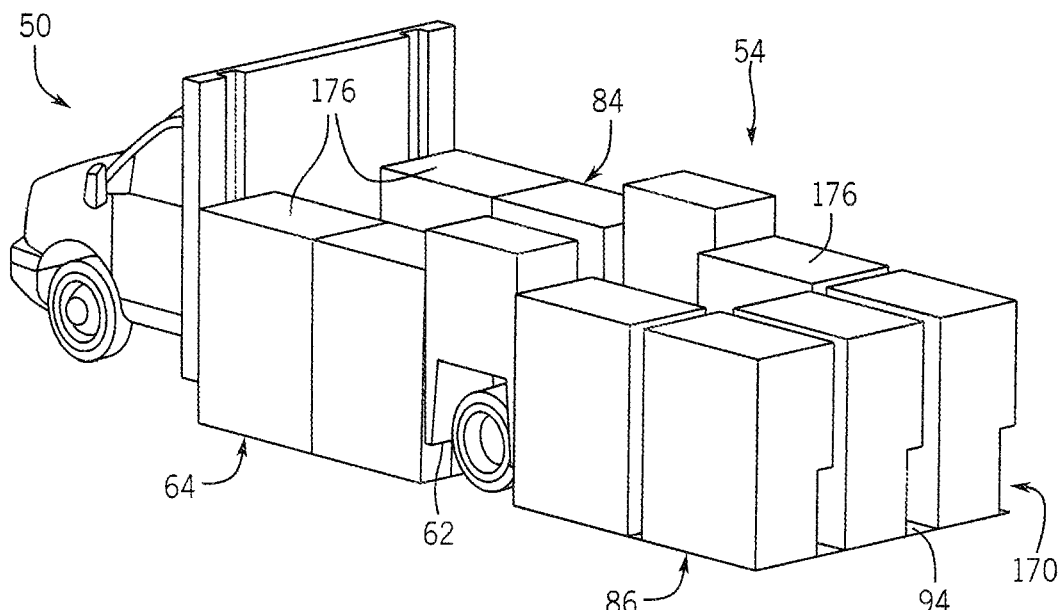
FIG. 7 illustrates a perspective view of a truck including cargo pod loading/unloading body systems according to a number of variations.
Figure 8:
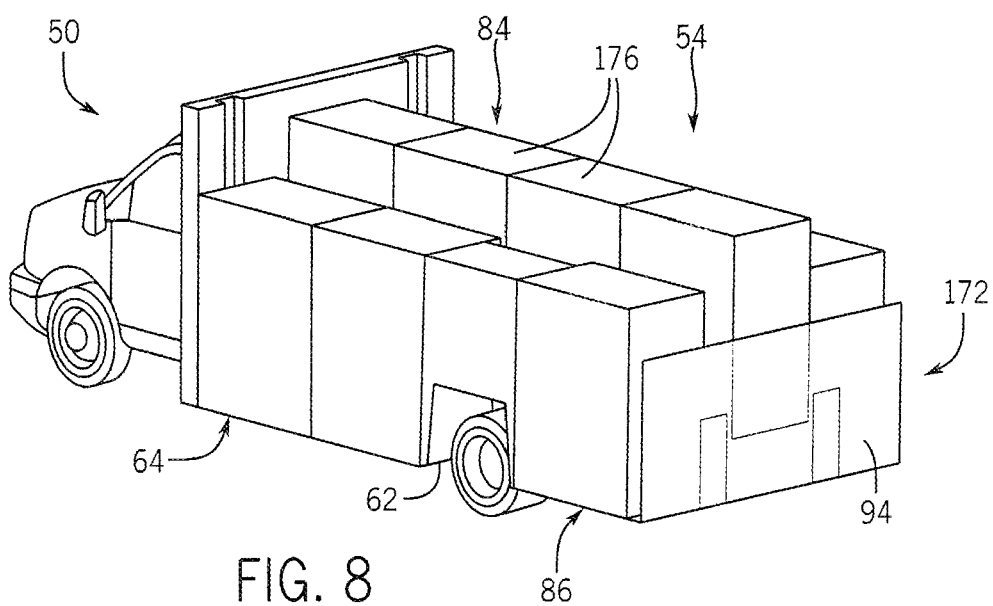
FIG. 8 illustrates a perspective view of a truck including cargo pod loading/unloading body systems according to a number of variations.
Figure 9:
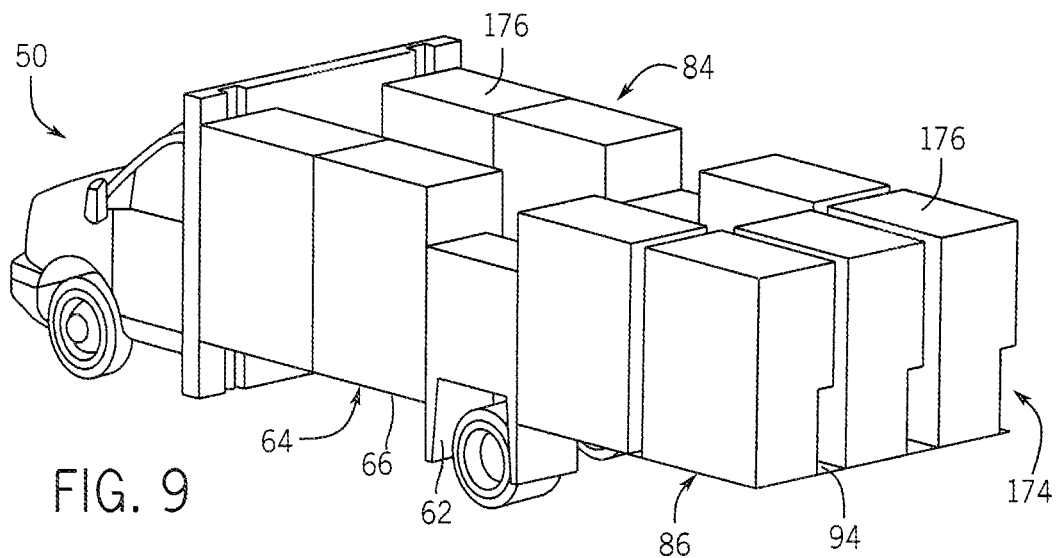
FIG. 9 illustrates a perspective view of a truck including cargo pod loading/unloading body systems according to a number of variations.

Referring to FIGS. 7-9, in any of a number of variations, the first, second, and third cargo pod lift systems 64, 84, 86 may be lifted or lowered to various positions including, but not limited to, a down position 170, for example as illustrated in FIG. 7, a driving position 172, for example as illustrated in FIG. 8, or a full position 174, for example as illustrated in FIG. 9.

Figure 10:
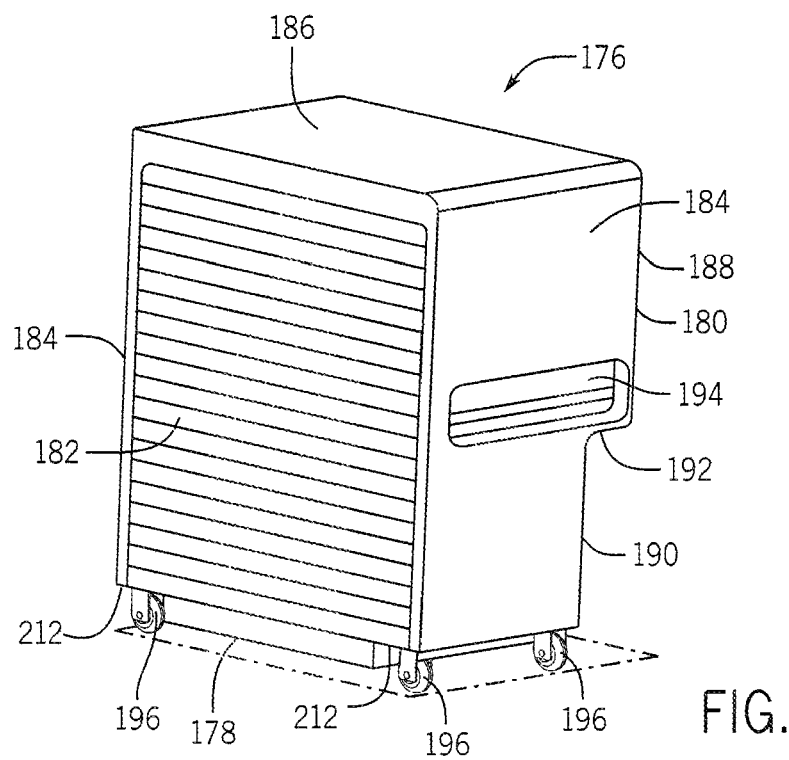
FIG. 10 illustrates a perspective view of a cargo pod according to a number of variations.

In any of a number of variations, one or more cargo pods 176 may be loaded into the cargo truck 50, for example as illustrated in FIGS. 7-9. Referring to FIG. 10, in any of a number of variations, a cargo pod 176 may comprise a bottom surface 178, a front wall 180, a rear wall 182, two opposing side walls 184, and a lid 186. The front wall 180 may include a first surface 188, a second surface 190, and a lip 192 extending between the first surface 188 and the second surface 190 so that the first surface 188 extends a distance further than the second surface 190. The rear wall 182 may be substantially planar. The opposing side walls 184 may each include a handle feature 194 which may be constructed and arranged so that an operator may lift and/or move the cargo pod 176, which may assist in the loading and unloading of the cargo pods 176. The handle feature 194 may include, but is not limited to, an indentation which may be constructed and arranged to accommodate a hand or a lifting device. In any of a number of variations, a plurality of wheels 196 may be attached to the cargo pod 176, for example, but not limited to, attaching the plurality of wheels 196 to the bottom surface 178 of the cargo pod 176. In one variation, the bottom surface 178 of the cargo pod may include one or more indentations 212 constructed and arranged to accommodate at least one wheel 196. The plurality of wheels 196 may be stationary or rotatable.

Figure 11:
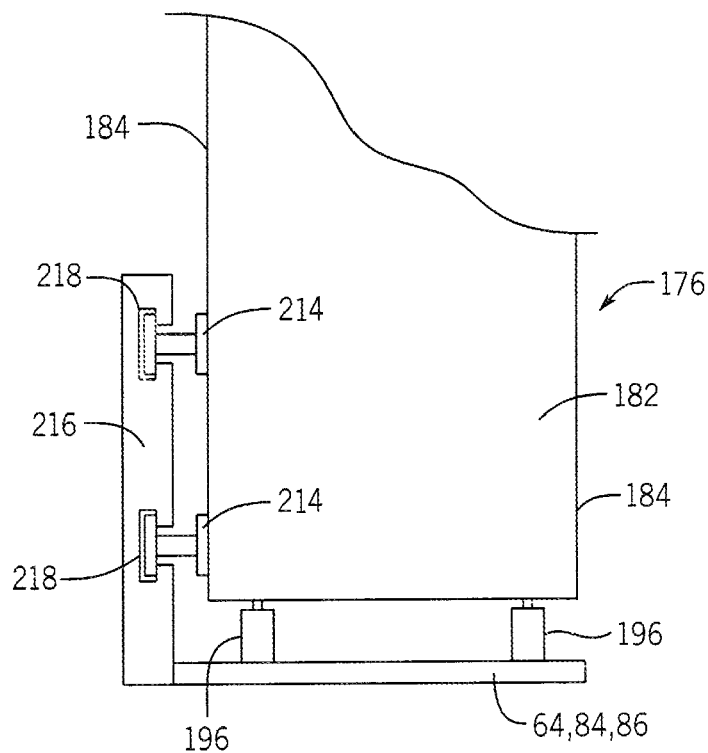
FIG. 11 illustrates a side view of a cargo pod latching/locking feature according to a number of variations.

Referring to FIG. 11, in any of a number of variations, cargo pod 176 may include any of a number of locking features, including, but not limited to a striker or peg 214, which may be constructed and arranged to mate with any of a number of locking features on the cargo pod lift system 64, 84, 86 including, but not limited to, a hoist plate 216 having one or more horizontal slots 218 which may be constructed and arranged to mate with the striker or peg 214 on the cargo pod 176. In one variation, the striker or peg 214 may be attached to one or more cargo pod side walls 184.

In any of a number of variations, one or more cargo pods 176 may be rolled onto or off of one or more of the cargo pod lift systems 64, 84, 86 when the cargo pod lift systems 64, 84, 86 are in a down position 170, for example as illustrated in FIG. 7. In any of a number of variations, the one or more cargo pods 176 may be lifted so that the cargo pod lift systems 64, 84, 86 are in a full position 174, for example as illustrated in FIG. 9. In the full position 174, the floors 66, 88, 92, 94 of the cargo pod lift systems 64, 84, 86, may be approximately level or even with the truck center aisle 56. This may allow for the loading of one or more cargo pods 176 onto the center aisle 56 from the fourth floor 94 of the cargo truck 50, or from the first or second cargo pod lifts 64, 84 which include a pass through opening (best illustrated in FIGS. 2 and 5). In any of a number of variations, when a cargo truck 50 is ready for travel, the cargo pod lift systems 64, 84, 86 may be placed in a driving position 172, wherein the floors 66, 88, 92, 94 of the cargo pod lift systems 64, 84, 86 are approximately in line with the bottom edge 62 of the wheelhouses 58, 60 which may reduce or eliminate the cargo pods 176 from moving freely in the truck body portion 54 and may provide clearance for the truck body 54 from the ground during transit.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a truck body comprising: a center aisle, a first wheelhouse, a second wheelhouse, and one or more cargo pod lift systems integrated into the perimeter of the truck body; and wherein the one or more lift systems are constructed and arranged to lift and lower one or more cargo pods.

Variation 2 may include a product as set forth in Variation 1 wherein the one or more cargo pod lift systems include a first cargo pod lift system, a second cargo pod lift system, and a third cargo pod lift system; wherein the first cargo pod lift system is adjacent a driver's side of the center aisle and forward of a driver's side wheelhouse; wherein the second cargo pod lift system is adjacent a passenger's side of the center aisle and forward of a passenger's side wheelhouse; and wherein the third cargo pod lift system is adjacent the driver's side of the center aisle rearward of the driver's side wheelhouse, adjacent the passenger's side of the center aisle rearward of the passenger's side wheelhouse, and adjacent the rear end of the center aisle.

Variation 3 may include a product as set forth in any of Variations 1-2 wherein the first cargo pod lift system includes a means for lifting and lowering the first cargo pod lift system; wherein the second cargo pod lift system includes a means for lifting and lowering the second cargo pod lift system; and wherein the third cargo pod lift system includes a means for lifting and lowering the third cargo pod lift system.

Variation 4 may include a product as set forth in any of Variations 1-3 wherein the first cargo pod lift system includes a first scissor type hoist; wherein the second cargo pod lift system includes a second scissor type hoist; and wherein the third cargo pod lift system includes a third and a fourth scissor type hoist.

Variation 5 may include a product as set forth in any of Variations 1-4 wherein the first cargo pod lift system includes a first cylindrical hoist system and a second cylindrical hoist system; wherein the second cargo pod lift system includes a third cylindrical hoist system and a fourth cylindrical hoist system; and wherein the third cargo pod lift system includes a first and a second scissor type hoist.

Variation 6 may include a product as set forth in any of Variations 1-5 further comprising a cargo truck.

Variation 7 may include a product as set forth in any of Variations 1-6 wherein the cargo truck body includes a driver's side wheelhouse and a passenger's side wheelhouse; and wherein a first storage box is attached to an upper surface of the driver's side wheelhouse and a second storage box is attached to an upper surface of the passenger's side storage box.

Variation 8 may include a product as set forth in any of Variations 1-7 further comprising a fixed bulkhead; wherein the first cargo pod lift system is attached to a first hydraulic cylinder hoist integrated into the fixed bulkhead and a second hydraulic cylinder hoist integrated into the first side storage box; wherein the second cargo pod lift system is attached to a third hydraulic cylinder hoist integrated into the fixed bulkhead and a fourth hydraulic cylinder hoist integrated into the second side storage box; and wherein the third cargo pod lift system is attached to a first scissor type hoist and a second scissor type hoist.

Variation 9 may include a product as set forth in any of Variations 1-8 wherein the first cargo pod lift system and the second cargo pod lift system each comprises a back wall adjacent the driver's side of the center aisle, a floor which extends from a bottom edge of the back wall, a first side wall adjacent a front edge of the back wall and a first side edge of the floor, and a second side wall located approximately central of a top surface of the floor and approximately central of the back wall, and a top shelf extending inboard toward the center aisle; and wherein a hoist system is attached to an underside of the top shelf.

Variation 10 may include a product as set forth in any of Variations 1-8 wherein the first cargo pod lift system and the second cargo pod lift system each comprise a back wall adjacent the driver's side of the center aisle, a floor which extends outboard from the center aisle from a bottom edge of the back wall and which is approximately twice the length of the back wall, a side wall attached to a first side edge of the floor and a first side edge of the back wall, and a top shelf which extends a distance inboard toward the center aisle; and wherein a hoist system is attached to an underside of the top shelf.

Variation 11 may include a product as set forth in any of Variations 1-8 wherein the first cargo pod lift system and the second cargo pod lift system each comprise a floor and wherein a first hoist system is attached to a first edge of the floor and a second hoist system is attached to a second edge of the floor.

Variation 12 may include a product as set forth in any of Variations 1-11 wherein the third cargo pod lift system comprises a first back wall, a first floor which extends outboard from a bottom edge of the first back wall, a first top shelf which extends a distance inboard from a top edge of the first back wall, and a first rear wall which is located adjacent a first side edge of the first rear wall and a first side edge of the first top shelf; a second back wall, a second floor which extends outboard from a bottom edge of the second back wall, a second top shelf which extends a distance inboard from a top edge of the second back wall, and a second rear wall which is located adjacent a side edge of the second rear wall and a second side edge of the second top shelf; and a third floor adjacent a first edge of the first floor and a bottom edge of the first rear wall and a first edge of the second floor and a bottom edge of the second rear wall.

Variation 13 may include a product as set forth in any of Variations 1-12 wherein the third floor comprises a hinge system which is attached to the third floor and which is constructed and arranged so that the third floor can lay open in a horizontal position or can be folded upward so that it is in a vertical position.

Variation 14 may include a product as set forth in any of Variations 1-13 further comprising a bulkhead attached to the front of the truck body; wherein the first cargo lift system comprises a first floor which extends a distance between the fixed bulkhead and forward of the driver's side wheelhouse adjacent the center aisle; and wherein a first edge of the first floor is attached to a first hoist system and a second edge of the first floor is attached to a second hoist system; wherein the second cargo lift system comprises a second floor which extends a distance between the fixed bulkhead and forward of the passenger's side wheelhouse adjacent the center aisle; and wherein a first edge of the second floor is attached to a third hoist system and a second edge of the second floor is attached to a fourth hoist system.

Variation 15 may include a product as set forth in any of Variations 1-14 wherein the first and the second hoist systems comprise a first and a second hydraulic cylinder hoist system which are integrated into the fixed bulkhead and wherein the third hoist systems comprises a third hydraulic cylinder hoist system which is integrated into a first side storage box which is located adjacent the driver's side wheelhouse and the fourth hoist system comprises a fourth hydraulic cylinder hoist system which is integrated into a second side storage box which is adjacent the passenger's side wheelhouse.

Variation 16 may include a product as set forth in any of Variations 1-15 wherein the one or more cargo lift systems include a first cargo lift, a second cargo lift, a third cargo lift, and a fourth cargo lift; wherein the first cargo lift is adjacent a driver's side of the center aisle and forward of a driver's side wheelhouse; wherein the second cargo lift is adjacent a passenger's side of the center aisle and forward of a passenger's side wheelhouse; and wherein the third cargo lift is adjacent the driver's side of the center aisle rearward of the driver's side wheelhouse and adjacent the passenger's side of the center aisle rearward of the passenger's side wheelhouse; and wherein the fourth cargo lift system is adjacent the rear end of the center aisle and the third cargo lift system.

Variation 17 may include a product as set for in any of variations 1-16 wherein the first cargo pod lift system includes a first and a second hydraulic cylinder hoist; wherein the second cargo pod lift system includes a third and a fourth hydraulic cylinder hoist system; wherein the third cargo pod lift system includes a first scissor type hoist and a second scissor type hoist; and wherein the fourth cargo pod lift system is attached to a vertical hydraulic hoist.

Variation 18 may include a product as set forth in any of Variations 1-17 wherein the fourth cargo pod lift system comprises a floor which comprises a hinge system attached to the truck body adjacent the third cargo pod lift system and which is constructed and arranged so that the third floor can lay open in a horizontal position or can be folded upward so that it is in a vertical position.

Variation 19 may include a method comprising: loading and unloading one or more cargo pods into a cargo truck comprising: integrating the perimeter of a truck body with one or more cargo pod lift systems; wherein the one or more cargo pod lift systems can be raised or lowered to any of a down position, a driving position, or a full position; lowering the one or more cargo pod lifts to a down position and loading one or more cargo pods onto the one or more cargo pod lift systems; raising the one or more cargo pod lift systems to a full position and loading the one or more cargo pods to a center aisle of the truck body; lowering the one or more cargo pod lift systems to the driving position during transport; raising the one or more cargo pod lift systems to load the cargo pods from the center aisle of the truck body back to the one or more cargo pod lift systems; and lowering the one or more cargo pod lift systems to a down position to unload the one or more cargo pods.

Variation 20 may include a method as set forth in Variation 19 wherein the one or more cargo pod lift systems include a first cargo pod lift system, a second cargo pod lift system, and a third cargo pod lift system.

Variation 21 may include a method as set forth in any of Variations 19-20 wherein each of the first, the second, and the third cargo pod lift systems are lifted simultaneously or lowered simultaneously.

Variation 22 may include a method as set forth in any of Variations 19-20 wherein each of the first, the second, and the third cargo pod lift systems are lifted independently or lowered independently.

Variation 23 may include a method as set forth in any of Variations 19-22 wherein the third cargo pod lift system includes a rear floor which includes a hinge system which can be folded upward to decrease the length of the truck body or can remain open in a horizontal position to provide additional storage space.

Variation 24 may include a method as set forth in any of Variations 19, or 21-23 wherein the one or more cargo pod lift systems include a first cargo pod lift system, a second cargo pod lift system, a third cargo pod lift system, and a fourth cargo pod lift system.

Variation 25 may include a method as set forth in any of Variations 19, or 21-24 wherein the first, the second, the third, and the fourth cargo pod lift systems are each lifted simultaneously or lowered simultaneously.

Variation 26 may include a method as set forth in any of Variations 19, or 21-24 wherein the first, the second, the third, and the fourth cargo pod lift systems are each lifted independently or lowered independently.

Variation 27 may include a method as set forth in any of Variations 24-26 wherein the fourth cargo pod lift systems comprises a rear floor which includes a hinge system which can fold the rear floor upward to decrease the length of the truck body or can remain open to provide additional storage space.

The above description of select variations within the scope of the invention is merely illustrative in nature and, thus, variations or variants thereof are not to be regarded as a departure from the spirit and scope of the invention.

What is claimed is:

1. A product comprising:
a truck body comprising:
a center aisle, a first wheelhouse, a second wheelhouse, and at least one cargo pod lift system integrated into a passenger side or a driver side of a perimeter of the truck body;
wherein the center aisle and the at least one cargo pod lift system is constructed and arranged to accommodate at least one cargo pod; and
wherein the one or more cargo pod lift systems are constructed and arranged to lift and lower the at least one cargo pod.

2. The product of claim 1 wherein the at least one cargo pod lift system includes a first cargo pod lift system, a second cargo pod lift system, and a third cargo pod lift system;
wherein the first cargo pod lift system is adjacent a driver's side of the center aisle and forward of a driver's side wheelhouse;
wherein the second cargo pod lift system is adjacent a passenger's side of the center aisle and forward of a passenger's side wheelhouse; and
wherein the third cargo pod lift system is adjacent the driver's side of the center aisle rearward of the driver's side wheelhouse, adjacent the passenger's side of the center aisle rearward of the passenger's side wheelhouse, and adjacent the rear end of the center aisle.

3. The product of claim 2 wherein the first cargo pod lift system includes a means for lifting and lowering the first cargo pod lift system;
wherein the second cargo pod lift system includes a means for lifting and lowering the second cargo pod lift system; and
wherein the third cargo pod lift system includes a means for lifting and lowering the third cargo pod lift system.

4. The product of claim 2 wherein the first cargo pod lift system includes a first scissor type hoist;
wherein the second cargo pod lift system includes a second scissor type hoist; and
wherein the third cargo pod lift system includes a third and a fourth scissor type hoist.

5. The product of claim 1 further comprising a cargo truck.

6. The product of claim 5 wherein the cargo truck body includes a driver's side wheelhouse and a passenger's side wheelhouse; and
wherein a first storage box is attached to an upper surface of the driver's side wheelhouse and a second storage box is attached to an upper surface of the passenger's side storage box.

7. The product of claim 6 further comprising a fixed bulkhead;
wherein the first cargo pod lift system is attached to a first hydraulic cylinder hoist integrated into the fixed bulkhead and a second hydraulic cylinder hoist integrated into the first side storage box;
wherein the second cargo pod lift system is attached to a third hydraulic cylinder hoist integrated into the fixed bulkhead and a fourth hydraulic cylinder hoist integrated into the second side storage box; and
wherein the third cargo pod lift system is attached to a first scissor type hoist and a second scissor type hoist.

8. A product comprising:
a truck body comprising:
a center aisle, a first wheelhouse, a second wheelhouse, and one or more cargo pod lift systems integrated into the perimeter of the truck body;
wherein the one or more cargo pod lift systems are constructed and arranged to lift and lower one or more cargo pods;
wherein the one or more cargo pod lift systems include a first cargo pod lift system, a second cargo pod lift system, and a third cargo pod lift system;
wherein the first cargo pod lift system is adjacent a driver's side of the center aisle and forward of a driver's side wheelhouse;
wherein the second cargo pod lift system is adjacent a passenger's side of the center aisle and forward of a passenger's side wheelhouse;
wherein the third cargo pod lift system is adjacent the driver's side of the center aisle rearward of the driver's side wheelhouse, adjacent the passenger's side of the center aisle rearward of the passenger's side wheelhouse, and adjacent the rear end of the center aisle; and
wherein the third cargo pod lift system comprises a first back wall, a first floor which extends outboard from a bottom edge of the first back wall, a first top shelf which extends a distance inboard from a top edge of the first back wall, and a first rear wall which is located adjacent a first side edge of the first rear wall and a first side edge of the first top shelf;

a second back wall, a second floor which extends outboard from a bottom edge of the second back wall, a second top shelf which extends a distance inboard from a top edge of the second back wall, and a second rear wall which is located adjacent a side edge of the second rear wall and a second side edge of the second top shelf; and a third floor adjacent a first edge of the first floor and a bottom edge of the first rear wall and a first edge of the second floor and a bottom edge of the second rear wall.

9. The product of claim 8 wherein the third floor comprises a hinge system which is attached to the third floor and which is constructed and arranged so that the third floor can lay open in a horizontal position or can be folded upward so that it is in a vertical position.

10. The product of claim 1 wherein the at least one cargo pod lift system includes a first cargo pod lift system, a second cargo pod lift system, a third cargo pod lift system, and a fourth cargo pod lift system;

wherein the first cargo pod lift system is adjacent a driver's side of the center aisle and forward of a driver's side wheelhouse;

wherein the second cargo pod lift system is adjacent a passenger's side of the center aisle and forward of a passenger's side wheelhouse; and wherein the third cargo pod lift system is adjacent the driver's side of the center aisle rearward of the driver's side wheelhouse and adjacent the passenger's side of the center aisle rearward of the passenger's side wheelhouse; and wherein the fourth cargo pod lift system is adjacent the rear end of the center aisle and the third cargo pod lift system.

11. The product of claim 10 wherein the first cargo pod lift system includes a first and a second hydraulic cylinder hoist;

wherein the second cargo pod lift system includes a third and a fourth hydraulic cylinder hoist system;

wherein the third cargo pod lift system includes a first scissor type hoist and a second scissor type hoist; and wherein the fourth cargo pod lift system includes a vertical hydraulic hoist.

12. The product of claim 10 wherein the fourth cargo pod lift system comprises a floor which comprises a hinge system attached to the truck body adjacent the third cargo lift system and which is constructed and arranged so that the third floor can lay open in a horizontal position or can be folded upward so that it is in a vertical position.

13. A method comprising:

loading and unloading one or more cargo pods into a cargo truck comprising:

integrating the perimeter of a truck body with one or more cargo pod lift systems;

wherein the one or more cargo pod lift systems can be raised or lowered to any of a down position, a driving position, or a full position;

lowering the one or more cargo pod lift systems to a down position and loading one or more cargo pods onto the one or more cargo pod lift systems;

raising the one or more cargo pod lift systems to a full position and loading the one or more cargo pods to a center aisle of the truck body;

lowering the one or more cargo pod lift systems to the driving position during transport;

raising the one or more cargo pod lift systems to load the cargo pods from the center aisle of the truck body back to the one or more cargo pod lift systems; and lowering the one or more cargo pod lift systems to a down position to unload the one or more cargo pods.

14. The method of claim 13 wherein the one or more cargo pod lift systems include a first cargo pod lift system, a second cargo pod lift system, and a third cargo pod lift system.

15. The method of claim 14 wherein each of the first, the second, and the third cargo pod lift systems are lifted simultaneously or lowered simultaneously.

16. The method of claim 14 wherein each of the first, the second, and the third cargo pod lift systems are lifted independently or lowered independently.

17. The method of claim 14 wherein the third cargo pod lift system includes a rear floor which includes a hinge system which can be folded upward to decrease the length of the truck body or can remain open in a horizontal position to provide additional storage space.

18. The method of claim 13 wherein the one or more cargo pod lift systems include a first cargo pod lift system, a second cargo pod lift system, a third cargo pod lift system, and a fourth cargo pod lift system.

19. The method of claim 18 wherein the first, the second, the third, and the fourth cargo pod lift system are lifted simultaneously or lowered simultaneously.

20. The method of claim 18 wherein the first, the second, the third, and the fourth cargo pod lift system are lifted independently or lowered independently.

* * * * *